United States Patent Office 3,371,889
Patented Mar. 5, 1968

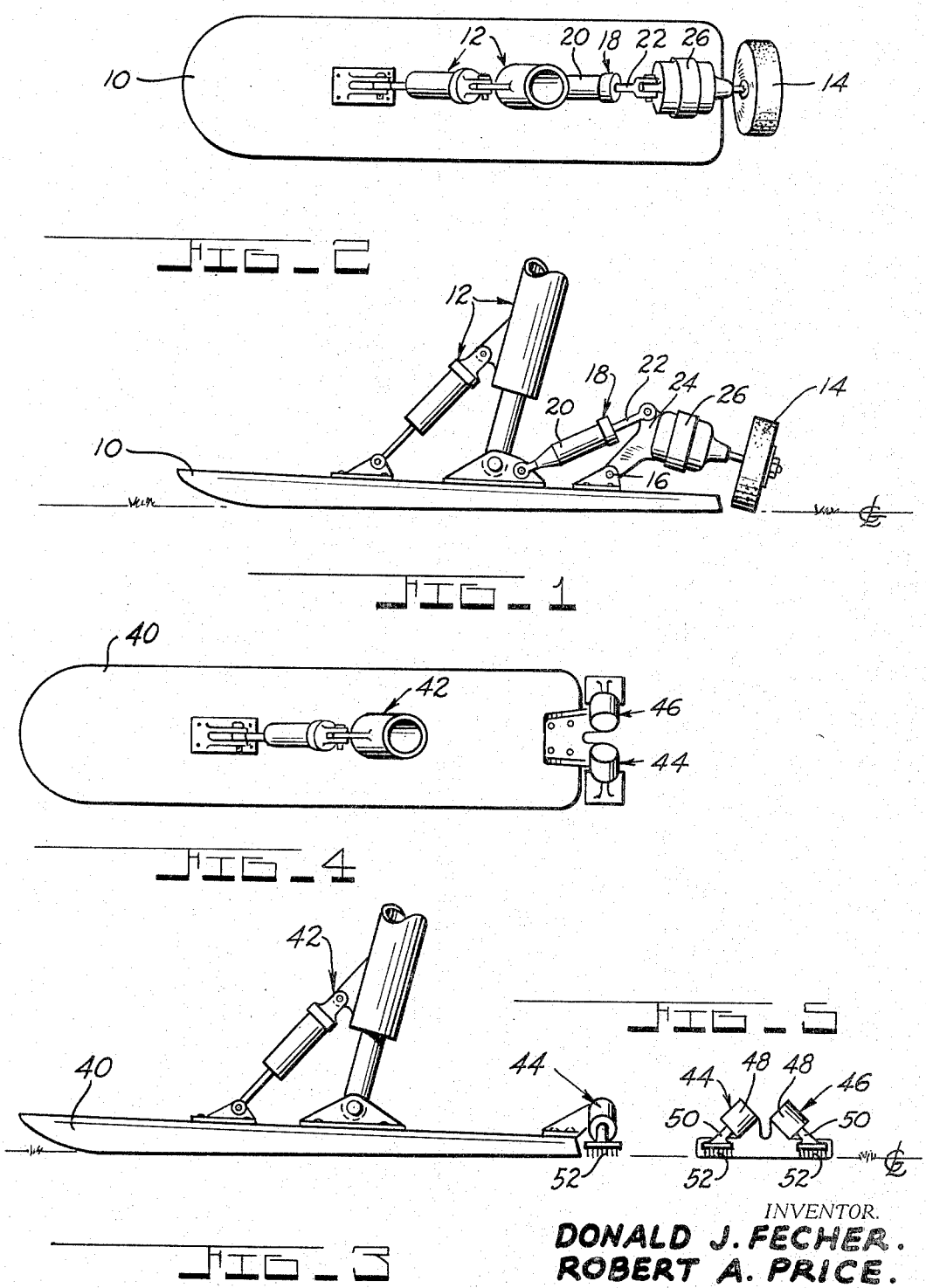

3,371,889
STEERABLE LANDING SKID
Donald J. Fecher and Robert A. Price, South Bend, Ind., assignors to The Bendix Corporation, a corporation of Delaware
Filed June 6, 1966, Ser. No. 555,636
4 Claims. (Cl. 244—50)

ABSTRACT OF THE DISCLOSURE

A steering device for a non-rotatable ground-engaging vehicle skid, such as a landing skid for an aircraft, which includes a movable ground-engaging mechanism for transmitting a positive lateral thrust against the ground to change the direction of movement of the skid with respect to the ground. The desired lateral thrust can be provided by a ground-engaging rotatable wheel, or by a pair of angularly disposed reciprocal ground-engaging pistons or "kickers."

---

In order to steer an aircraft equipped with landing skids, it is necessary to provide a positive side force at the skid or at the center of gravity of the vehicle. Accordingly, it is an object of this invention to provide new and improved steering means for providing such a force.

Generally, it is an object of this invention to provide a steering device for a non-rotatable ground engaging vehicle skid which includes a movable ground engaging mechanism for transmitting a positive lateral thrust against the ground to change the direction of movement of the skid with respect to the ground, and power driven means operatively connected to the ground engaging mechanism for causing predetermined movement thereof with respect to the ground irrespective of the direction of movement of the skid and for exerting a force therethrough to provide the desired lateral thrust.

Another object of this invention is to provide a steering device of the type described wherein the movable ground engaging mechanism is caused to frictionally engage the ground with a predetermined pressure exerted by the power driven means.

More specifically, it is an object of this invention to provide a steering device of the type described wherein the ground engaging mechanism includes a wheel rotatable in a clockwise or counterclockwise direction which is forced to contact the runway surface with a known pressure to provide the desired lateral thrust, or a pair of angularly disposed reciprocal pistons or "kickers," which are operated singly to provide the desired lateral thrust through a series of pulse type strokes.

A further object of this invention is to provide a steering device for a non-rotatable ground engaging vehicle skid which will be effective on any type of ground surface.

The above and other objects and features of the invention will become apparent from the folowing description taken in connection with the accompanying drawing which forms a part of this disclosure and in which:

FIGURE 1 is a side plan view of a landing skid incorporating the invention;

FIGURE 2 is a top view of the landing skid shown in FIGURE 1;

FIGURE 3 is a side plan view of a landing skid incorporating another embodiment of the invention;

FIGURE 4 is a top view of the landing skid shown in FIGURE 3; and

FIGURE 5 is an end view of the landing skid shown in FIGURE 3.

Referring to FIGURES 1 and 2, it will be seen that numeral 10 indicates a landing skid which is suitably connected to an aircraft (not shown) through a conventional shock strut mechanism indicated generally by the numeral 12. It will be understood that each aircraft will utilize a plurality of such skids and that for an aircraft utilizing a main and nose type landing gear, three such skids could be used.

In order to steer an aircraft equipped with such skids, each skid 10 utilizes a ground engaging wheel 14 which is connected to the skid through a suitable pivotal connection 16. An actuator 18, having a cylinder 20 pivotally connected to the skid and a piston rod 22 pivotally connected to a wheel supporting member 24, is utilized to move the wheel 14 into engagement with the ground. A motor 26, which is suitably connected to the wheel supporting member 24 and the ground engaging wheel 14 is utilized to cause rotation of the wheel in either a clockwise or a counterclockwise direction. The motor can be of any suitable type and can be driven electrically, hydraulically, or pneumatically. Since the wheel 14 is rotatable in a direction substantially normal to the forward direction of the skid 10, rotation of the wheel in a clockwise direction after engagement with the ground will cause the skid and aircraft to turn towards one side of the straight-ahead direction, whereas rotation of the wheel in a counterclockwise direction will cause the skid and aircraft to turn towards the other side of the straight-ahead direction. Since the wheel is forced to contact the ground with a predetermined pressure, rotation of the wheel normal to the forward direction of the skid will provide a positive predictable lateral thrust which will permit accurate steering and control of the aircraft during landing. Those skilled in the art will readily understand that the wheel 14 may be made of various compositions and may be constructed in various ways. For example, the surface of the wheel could consist of a wire brush-like material or a suitable ceramic material. More specifically, a suitable friction surface could be provided attaching tungsten carbide grains to the wheel by copper brazing and then flame spraying it with a copper nickle alloy.

In the embodiment shown in FIGURES 3, 4 and 5, a skid 40 is suitably connected to an aircraft (not shown) through a conventional shock strut mechanism indicated generally by the numeral 42. Instead of utilizing a reversible rotatable wheel to provide the desired lateral thrust, a pair of angularly mounted kickers 44 and 46 are located at the rear of the skid and in a plane substantially normal to the forward direction of the skid. Each of the kickers 44 includes a cylinder 48 and a piston member 50 which is reciprocally movable between predetermined limits to provide the desired lateral thrust through a series of pulse type strokes. A suitable friction shoe 52 is located at the end of the piston member to provide the necessary frictional engagement with the ground. Thus, upon actuation, pulsating movement of one of the angularly disposed piston members against the ground will cause the skid and aircraft to turn towards one side of the straight-ahead direction, whereas pulsating movement of the other angularly disposed piston member will cause the skid and aircraft to turn towards the other side of the straight-ahead direction. It will be understood that the actuators 44 and 46 can be of any suitable type and can be actuated by any suitable power source which will cause the piston members to move in a series of pulse type strokes.

The several practical advantages which flow from this invention are believed to be obvious from the above description, and other advantages may suggest themselves to those who are familiar with the art to which the invention relates.

Furthermore, although this invention has been described in connection with certain specific embodiments, it will be obvious to those skilled in the art that various changes may be made in the form, structure and arrangement of parts without departing from the spirit of the invention. Accordingly, we do not desire to be limited to the specific embodiments disclosed herein primarily for purposes of illustration, but instead desire protection falling within the scope of the appended claims.

Having thus described the various features of the invention, what we claim as new and desire to secure by Letters Patent is:

1. A steering device for a non-rotatable ground-engaging vehicle skid comprising ground-engaging means operatively connected to said skid for transmitting a positive lateral thrust against said ground to change the direction of movement of said skid with respect to said ground, and power-driven means operatively connected to said ground-engaging means for causing predetermined movement thereof with respect to said ground irrespective of the direction of movement of said skid and for exerting a force therethrough to provide said lateral thrust, said ground-engaging means including movable mechanism caused to frictionally engage said ground with a predetermined pressure exerted by said power-driven means, said movable mechanism including a piston means mounted for recriprocal movement between predetermined limits to provide the desired lateral thrust through a series of pulse-type strokes.

2. A steering device, as defined in claim 1, wherein said piston means is angularly mounted with respect to said skid and is located in a plane substantially normal to the forward direction of said skid.

3. A steering device, as defined in claim 2, wherein said piston means includes a first reciprocal ground engaging piston member for causing said skid to turn towards one side of a straight-ahead direction and a second reciprocal ground engaging piston member for causing said skid to turn towards the other side of said straight-ahead direction.

4. A steering device, as defined in claim 3, wherein said power driven means includes a first actuator operatively connected to said first piston member for causing said first piston member to engage said ground with pulse type strokes and a second actuator operatively connected to said second piston member for causing said second piston member to engage said ground with pulse type strokes.

References Cited
UNITED STATES PATENTS 3,128,065　4/1964　Landes _____ 244—108

FOREIGN PATENTS 27,394　2/1932　Netherlands.

FERGUS S. MIDDLETON, *Primary Examiner.*

MILTON BUCHLER, *Examiner.*

B. BELKIN, *Assistant Examiner.*